3,767,789
METHOD OF PROVIDING A SYNTHETIC
MUCUS IN VIVO
Billy F. Rankin, Rockville, Md., assignor to Burton, Parsons & Company, Inc., Washington, D.C.
No Drawing. Continuation-in-part of application Ser. No. 44,564, June 8, 1970, which is a continuation-in-part of abandoned application Ser. No. 773,947, Nov. 6, 1968, which in turn is a continuation-in-part of abandoned application Ser. No. 881,336, Dec. 1, 1969. This application June 21, 1971, Ser. No. 155,260
Int. Cl. A61k 15/00, 27/08
U.S. Cl. 424—78                 7 Claims

ABSTRACT OF THE DISCLOSURE

A synthetic mucus is applied to mucus membranes by forming an aqueous solution of about .05 to 10 weight percent of a polyethylene oxide having a molecular weight of at least about 100,000.

---

This application is a continuation-in-part of applicant's copending application Ser. No. 44,564, filed June 8, 1970, and in turn, of Ser. No. 773,947, filed Nov. 6, 1968, now abandoned and Ser. No. 881,336, filed Dec. 1, 1969, now abandoned.

This application relates to a synthetic mucus composition and, more particularly, to a composition which can be employed as a substitute or a supplement for natural mucus occurring on the surfaces of mucus membranes and tissues.

Mucus membranes and mucus-producing tissues occur widely throughout the body, and particularly in respiratory passages, the alimentary canal, and throughout the intestinal tract. Natural mucus, as it is generated in vivo, is a complex solid gel secreted by specialized mucus-producing cells. Secretions from a number of cells coalesce to form a continuous superficial layer which serves as a protective covering for the mucosa and also functions to stabilize the micro-environment of mucosal tissues and cells.

The mucus film is made up of a number of macromolecules which are arrayed in ordered form by electrostatic forces and by hydrogen bonding. The effectiveness of the forces which maintain the integrity of the mucus film is reduced by increases in ionic strength and reduced pH in the environment; increased levels of electrolytes and hydrogen ions effectively operate to disrupt the electrostatic charges which bind the molecules together.

The constituent molecules which make up the film are themselves basically relatively stable in composition and structure since all bonds are primary valence bonds. The molecules are not substantially affected by the normal range of environmental changes to which they are subjected. The molecules are made up of, or can be degraded to, a variety of complex glycoproteins, polypeptides, and pepsin. The molecules have molecular weights on the order of $2.04 \times 10^6 \pm 7\%$.

In the role of a stabilizer of the microenvironment of mucosal tissues, it appears that mucus films serve as physical buffers, as ultra-filters, and as ion-exchangers, all on a micro scale. The individual molecules are linked by a plurality of both electrostatic bonds and hydrogen bonds to form a tough, resilient, lubricious film with a substantial ability to withstand and abosrb mechanical shock and abrasion, and thus serve to insulate mucosal tissues from physical trauma. In addition, the cross-linked mesh of molecules is permeable, but to a limited degree. For example, most solvents will penetrate the film, but only at relatively slow rates. Molecules larger than a certain, as yet indefinite, limit, are effectively excluded by the film. Other, smaller molecules pass through the film at regulated rates. Further, the molecules contain a number of charged end groups which are believed to function as ion-exchange elements. The selective permeability and ion exchange character further serve to control the immediate microenvironment of the underlying tissues.

Generally, mucus films are well adapted to fulfill their normal functions, and although in time exposure to environmental factors gradually reduces the quality of the surface of the film and eventually results in sloughing off of the macromolecules, in normal circumstances, the specialized mucus producing cells continuously replenish and renew the film and maintain its integrity. There are occasions, however, when the production of mucus is retarded or when extreme environmental factors disrupt the film. Examples of such circumstances include a number of pathological conditions of the mucosa, hyperacidity of the gastric tract, and, as a relatively extreme circumstance, the ingestion of barium sulfate emulsions associated with X-ray contrast photography of the intestinal tract. Such conditions or occurrences can result in minor temporary discomfort, or more severe and durable problems. As an illustration, disruption of the mucus film has been associated with the development of gastric ulcers. In the case of radiopaque compositions, such as barium sulfate emulsions, disruption of the mucus film can result in the adherence of substantial amounts of the material adhering to the intestinal walls, with less than complete evacuation at the conclusion of the photography.

Accordingly, the desirability of means to replace or supplement natural mucus is readily apparent. Thus, it is an object of the present invention to provide a safe, non-toxic and non-irritating technique which can effectively provide in vivo a synthetic mucus. It is another object to provide a method suitable to replace natural mucus. An additional object is to provide a method effective to supplement natural mucus and reinforce its natural functions.

These and still other objects, as will be apparent from the following disclosure, are attained by the present invention, which in its broadest terms, comprises the administration of an aqueous solution of a polyalkylene oxide polymer, preferably a polyethylene oxide polymer, having a molecular weight greater than about 100,000, preferably greater than about 1,000,000, and still more preferably on the order of about 3,000,000 to 5,000,000.

The method of the present invention is applicable to the treatment of mucus membranes generally, but finds its greatest utility and ease of use in the alimentary and gastro-intestinal tracts, and it is accordingly with particular reference to such employment of the method that the present invention will be principally discussed. It is not intended, however, that the present invention be limited thereby; rather, the following should be construed as the best mode contemplated by the inventor of practicing the invention. Treatment of other parts of the body where mucus membranes occur is also contemplated and should be considered a material part of the present invention.

Polyethylene oxide is known to exhibit excellent lubricating characteristics in aqueous solution and is freely soluble in water without degradation of hydrolysis. Wide ranges of molecular weights are available, and in the present invention, can be from 100,000 up to several million, e.g., 5,000,000 or even greater. The higher molecular weight materials are preferred in the present invention, and a range of 3,000,000 to 5,000,000 has been found particularly useful. Most preferred is a polyethylene oxide having a molecular weight of about 4,000,000. Such resins have extraordinary thickening action in water, even in the presence of salts. The thickening power increases sharply with both concentration and molecular weight. Thus, to attain the desired viscosity, substantially less ethylene oxide polymer is required for a relatively higher weight than would be the case when a lower molecular weight polymer is utilized. In addition, the higher molecular weights result in a higher strength lubricating film in solutions due to orientation of polymer molecules. The concentration of the ethylene oxide polymer will vary in the present invention with the molecular weight to provide a viscosity of from 0 to about 30,000 cps. at 20° C. as measured by Brookfield viscosimeter, where viscosities of from 0 to about 200 cps. being measured using the ultra low viscosity adaptor rotated at a speed of 0.6 r.p.m., and viscosities greater than about 200 cps. are measured with a number 6 spindle rotated at 10 r.p.m. Such viscosities will ordinarily be obtained when the concentration is within the range of about .05 to 10.0 weight percent, depending upon the molecular weight of the polymer employed. With lower viscoities, whether due to lower molecular weight polymers or lower concentration, or both, inferior or inadequate performance results, while higher viscosities result in difficult handling properties and characteristics, including insufficient flowability for full effective utilization in the intestinal tract.

The high molecular weight ethylene oxide polyethers utilized in the present invention can be conveniently prepared in the presence of a catalyst and an organic diluent in which the ethylene oxide monomer is soluble and the polymeric product is insoluble. During polymerization, the polymer chain grows through addition of the ethylene oxide monomer to an alkene oxide radical derived from previously reacted monomer units. The resultant materials are granular, tough, water soluble polymers which can range in molecular weight from about 100,000 to 5,000,000 or even more. The specific techniques, for producing these polymers are well-known to the art and form no part of the present invention.

Aqueous solutions of the polyethylene oxide resins have a low level of oral toxicity and an extreme level of campatability in contact with mucus membranes. They are also characterized by high level of pituitousness and an extraordinarily high degree of psuedo-plasticity. The solutions are highly stable through a wide range of temperatures and can tolerate extremely wide variations in pH. Since the resins are non-ionic, their solutions undergo predictable salting effects and the inclusion of salts depresses the upper temperature limit of solubility and tends to reduce solution viscosities. The salting out effect is mild in comparison with that observed in the cases of polyelectrolytes, but is comparable with that observed to other neutral molecules dissolved in high dielectric media. As a consequence, solutions of relatively low concentration of resin, on the order of those contemplated in the present invention, can tolerate substantial amounts of both organic and inorganic salts.

Because of the strong hydrogen-bonding affinity of the ether oxygen in the polyethylene oxide chain, the resin solution will form association complexes with a wide variety of materials. Such associations complexes per se often exhibit properties markedly different from either component alone, but it has been found that the resin will give up associated materials when introduced into the body. The dissociation in vivo may result from a salting out effect produced by the materials with which the solutions are contacted, e.g., various salts, acids, and the like, occuring in the intestinal tract.

It should be noted taht a viscosity of zero as measured reflects the limitations of the available techniques, and does not represent such an anomaly as it might superficially appear. It should further be noted that all designations of viscosity appearing herein represent the values as obtained with the Brookfield viscosimeter, where all values below 200 are obtained with the ultra low viscosity adapter at 0.6 r.p.m. and all values above 200 are obtained with a number 6 spindle at 10 r.p.m. For values ranging from about 175 to about 250 cps., results obtained by the two differing measurements are generally comparable in the case of the present solutions.

It is not at present understood precisely how the aqueous solutions of polyethylene oxide function in vivo, and applicant does not wish to be bound by any theory or hypothesis. However, it is considered likely that the functional effect is attributable to the strong hydrogen bonding affinity of the ether oxygen in the polymer chain. In vivo, the polyethylene oxide forms an association complex with existing mucus and serves to reinforce and supplement the film. Even where pathological conditions or abnormal situations create an imbalance between the production of mucus and the degradation of the mucus film, at least some mucus will be present on mucosal surfaces and will provide a base for the development of a thicker, stronger film by the method of the present invention.

The aqueous solution of the polyethylene oxide is sufficient to provide the synthetic mucus in accordance with the present invention, but in particular circumstances it can be desirable to include other materials for particular functional purposes. For example, because of the high levels of pseudo-plasticity and pituitousness of aqueous polyethylene oxide solutions, it is occasionally desirable to include in the solution a material which will render a plasticizing effect. That can readily be provided by the incorporation into the solution of a polyalkylene glycol. The preferred polyalkylene glycol is polyethylene glycol, such as the various Carbowaxes, as supplied in commerce by Carbide and Carbon Chemicals Company. Such materials often have molecular weights ranging from about 400 up to about 6000. Particularly preferred in the present invention is polyethylene glycol having a molecular weight of about 4,000, although this preference is primarily because of the ready availability and convenience of processing of the particular material. Polyglycols containing other alkylene groups, or mixtures of alkylene groups, can also be utilized, such as polypropylene glycols and the like, but such materials are often not readily and widely available, and for this reason alone, these materials are not particularly preferred in the practice of the present invention. The amount of the plasticizing material employed in the present invention is not narrowly significant, and can range up to as much as about 5000 percent, based on the amount of the polyethylene oxide. Greater amounts could be employed, but are not generally preferred, since a "salting-out" effect may occur, with the formation of waxy solid globules or particles in the solution.

In addition to the per se usefulness of the present method to provide a synthetic mucus, the aqueous solution employed in the present invention finds an additional area of broad utility as a carrier of treating materials such as medicaments, nutraments, vitamins, and minerals, particularly those requiring an acid pH. The exceptional effectiveness of the administration of medicaments within the context of the present invention is believed attributable to the strong hydrogen bonding affinity of the ether oxygen of the polyethylene oxide. When employed in the present invention, various medicaments are found to exhibit much greater retention on mucosal tissues, and a greatly enhanced duration of activity. The greater retention of the medicament permits the employment of greatly reduced dosages than has been commonly practiced while maintaining necessary levels of effectiveness. Hence, the dangers of side effects and adverse reactions to the medicament is substantially reduced. The amounts of dosages and the proportions based on the synthetic mucus solution employed in the present invention depends on the nature of the particular medicament employed and the response of the individual receiving treatment. Typically, up to about 500 percent or more, based on the amount of polyethylene oxide, can be employed if appropriate.

In the treatment of conditions where hyperacidity is a factor, it is also possible to include in the synthetic mucus solution a wide variety of bases and pH buffers and the like, either alone or in conjunction with appropriate medicaments. In such fashion, it is possible to produce a wide and controlled variation in pH, both in the synthetic mucus solution and in the gastrointestinal tract. Appropriate materials for such purposes are well known in the art, and need no extensive discussion, and can include, in well known fashion, a variety of borates, phosphates, acetates, and carbonates as buffers and a variety of oxides, hydroxides, and carbonates as bases.

A variety of water soluble cellulose derivatives, such as, for example, methyl cellulose, hydroxyethyl cellulose, hydroxypropyl cellulose, carboxymethyl cellulose, hydroxypropyl methyl cellulose, and the like, can be included to serve in the synthetic mucus as a mechanical buffer or as a viscosity controlling agent, and can be employed to maintain the viscosity of the overall solution within the desired range.

In addition, the stability of the solution and the compatability of the various components can be enhanced by the inclusion of appropriate surfactants, in amounts varying over a wide range, but typically up to about 0.5 percent of the solution. Non-ionic surfactants are preferred, and examples include Tergitol 1559 (Carbide & Carbon Chemicals Co.); Pluronic F68 (Wyandotte Chemical Corp., Michigan Alkali Div.); Tweens of H.L.B. value of 11 or greater (Atleas Powder Co.).

Still another secondary component which can be added to the solutions employed in the present invention is polyvinyl pyrrolidone, such as Plasdone C (GAF Corp., Entira Chemicals Div.) which performs a number of useful functions. The polyvinyl pyrrolidone (PVP) acts as a detoxicant, binding anti-toxins present in gastric fluids and in mucosal tissues, and renders them compatible. PVP also prevents agglomeration of the components of the solution, and acts as a demulcent lubricant which aids in the spreading of the viscous solution on the surface of the mucosa. The PVP can be present in amounts up to about 10 percent of the solution.

The foregoing illustrations of secondary additives for the synthetic mucus solution employed in the method of the present invention is intended to be merely exemplary of the more common additives desirable in such contexts. It should be understood that such additives are not required for effective operation of the method of the present invention. Nor is it intended by the enumeration of certain additives to exclude others.

The synthetic mucus solution employed in the present invention is readily formed by combining the several ingredients, although occasionally, the polyethylene oxide material can provide difficulties in readily dissolving. Such difficulties can be avoided by utilization of the following technique.

An increment of distilled water sufficient to dissolve the constituents of the solution is placed in a stainless steel container equipped with a stirrer and heated to about 50° C. If a surfactant is employed, it is dissolved first in the water with mild stirring. Any medicament, pH buffers, a polyalkylene glycol, and any other readily soluble ingredients are then dissolved with medium speed stirring. PVP and a soluble cellulosic derivative, if either are employed, are then successively added gradually into the vortex created by high speed stirring. When all the other components are completely dissolved, the polyethylene oxide is sifted slowly into the vortex with high speed stirring, and then the speed is reduced to produce a mild agitation until solution is complete—typically about 2 to 5 hours. Additional distilled water is then added to bring the solution to volume.

Because the polyethylene oxide can be precipitated at high temperatures, the product solution can be sterilized, before or after packaging, by treatment with ethylene oxide gas. It is also possible to sterilize with heat, since the resin will redissolve when the temperature is reduced.

EXAMPLE I

As an illustration of the method of the present invention, polyethylene oxide having a molecular weight of about 4,000,000 (Polyox WSR, Union Carbide Corp.) is dissolved in distilled water to form a 5 percent solution. The solution is administered orally in a dosage of about 150 to 20 ml. to a stomach ulcer patient five times daily, upon rising, one hour after meals, and upon retiring, for a period of two weeks. The effect of the treatment is not readily susceptible to evaluation, but subjective symptoms are reduced.

EXAMPLE II

In order to provide an objective evaluation of the effects of the method of the present invention containing the aforementioned secondary additives, the following composition is prepared on a relatively large scale:

bacteriocide (Thimerosal, 10%)—240 cc.
disodium phosphate—1200 grams
polyethylene glycol (MW 4,000)—6000 grams
polyvinyl pyrrolidone—3000 grams
disodium ethylenediaminetetracetate—600 grams
non-ionic surfactant—132 grams
hydroxyethyl cellulose (MW 52,000)—3000 grams
polyethylene oxide (MW 4,000,000)—3000 grams
distilled water—150 gallons The solution formed from the foregoing components is clear and free of polymer globules, and is found to have a pH of about 7.3 and a viscosity of about 150 cps.

The solution thus provided is utilized in conjunction with air-contrast X-ray photography of the large intestine. The solution is utilized as an enema to clean the intestine; by preliminary photographs, it is found that impacted facal matter is far more effectively removed than with conventional enema. A barium sulfate emulsion is then administered by enema and X-ray photographs are taken in conventional fashion. It is found that greatly improved contrast results, indicating that the barium compound adheres to the bowel wall in a smooth and exceptionally effective fashion. Greater detail can be distinguished on the photographs. It is also found that when the procedure is completed, the barium radiopaque composition is more readily and cleanly evacuated (without the use of a laxative). Post procedure photographs indicate that the barium compound does not impact or flocculate in the bowels, and is more completely removed by the evacuation than by customary procedures.

EXAMPLE III

A synthetic mucoid antacid composition is prepared by combining the following ingredients in the specified proportions:

polyethylene oxide (MW 4,000,000)—7.0 grams
colloidal magnesium aluminum silicate—18.0 grams
Calcium carbonate—370.0 grams
magnesium carbonate—60.0 grams
carboxymethyl cellulose—6.0 grams
sorbital—225.0 grams
potassium sorbate—3.6 grams
sodium saccharine—0.9 grams
surfactant (Tween 80)—2.0 cc.
synthetic lemon-lime flavor—14.0 cc.
de-ionized water—1275.0 cc.

The composition is employed as a liquid ingestible antacid composition in conventional fashion. Subjective symptoms of hyperacidity are effectively eliminated within a short period after ingestion.

EXAMPLE IV

A mouthwash and gargle composition in accordance with the present invention is prepared by combining the following ingredients:

polyethylene oxide resin (MW 4,000,000)—4.6 grams
10% aluminum acetotartrate aqueous solution—300.0 cc.
Tr. Cochineal—60.0 cc.
menthol—3.0 grams
ethanol—30.0 cc.
peppermint oil—15.0 cc.
sodium saccharine—2.0 grams
de-ionized water—3000 cc.

The mouthwash and gargle composition is employed by a number of patients suffering from sore throats associated with colds. Upon gargling with the composition of the present example, the patients report a substantial pallative effect which persisted for up to 12 hours.

While certain specific considerations have been enumerated and discussed herein, such have been offered solely to exemplify the present invention and to facilitate the understanding thereof by those of ordinary skill in the art, and should in no way be construed as limiting. The proper scope and nature of the present invention is set forth in the following claims:

What is claimed is:

1. A method of insulating mucosal tissues from physical trauma by forming a synthetic mucus adhering on the mucus surface subject to disruption of an inter vivos mucus membrane of the alimentary and gastrointestinal tract of a subject suffering from disruption of the mucus film as a result of physical trauma comprising forming an aqueous solution consisting essentially of an ethylene oxide homopolymer having a molecular weight of at least about 100,000 in a concentration of from about 0.05 to 10.0 weight percent, said concentration having sufficient effective viscosity for adequate performance and sufficient handling characteristics, and applying said solution orally or rectally to said mucus membrane, thereby forming a tough, resilient, lubricious film with a substantial ability to withstand and absorb mechanical shock and abrasion.

2. The method of claim 1 wherein said solution is administered by oral ingestion and wherein said solution further consists of minor effective amounts of at least one member selected from the group consisting of pH buffers, mechanical buffers, surfactants, detoxicants, bacteriocides, sequestrants, and antacids.

3. The method of claim 1 wherein said ethylene oxide polymer has a molecular weight greater than about 1,000,000.

4. The method of claim 1 wherein said ethylene oxide polymer has a molecular weight of from about 3,000,000 to about 5,000,000.

5. The method of claim 1 wherein said ethylene oxide polymer has a molecular weight of about 4,000,000.

6. The method of claim 1 wherein said ethylene oxide polymer is present in said solution at a concentration of from about 3 to 8 weight percent.

7. The method of claim 1 wherein said solution is administered as a rectal enema in an air-contrast X-ray photography procedure and wherein said solution further consists of minor effective amounts of at least one member selected from the group consisting of pH buffers, mechanical buffers, surfactants, detoxicants, bacteriocides, sequestrants, and antacids.

References Cited
UNITED STATES PATENTS 3,120,469   2/1964   Tamas _____ 424—79

OTHER REFERENCES

Union Carbide brochure, "Polyox Water-Soluble Resins" (7 pp.)

SHEP K. ROSE, Primary Examiner

U.S. Cl. X.R.

424—4